June 15, 1965 D. J. HEALEY III 3,189,895
AUTOMATIC RANGE TRACKING DEVICE
Filed June 13, 1955 3 Sheets-Sheet 1

WITNESSES
Edwin E. Bassler
T. H. Murray

INVENTOR
Daniel J. Healey, III
BY
F. E. Browder
ATTORNEY

United States Patent Office 3,189,895
Patented June 15, 1965

3,189,895
AUTOMATIC RANGE TRACKING DEVICE
Daniel J. Healey III, Cockeysville, Md., assignor to Westinghouse Electric Corporation, East Pittsburgh, Pa., a corporation of Pennsylvania
Filed June 13, 1955, Ser. No. 514,804
13 Claims. (Cl. 343—7.3)

My invention relates to automatic radar target tracking systems and, in particular, to the range following or tracking portion of such systems.

The more elementary types of radar apparatus, as is well known, send out a beam of spaced pulses of ultra-short radio waves which reflect from any conductive body which may intercept the beam and may be picked up by a receiver at their transmitting point after a time interval corresponding to the distance or range of the target body from the transmitter. This range is often indicated by the position along a base-line on an oscilloscope screen of "pips" produced by the pulse returning from the target. If the beam of such a radar apparatus is kept pointed continuously at a moving target, it is possible by proper servomechanisms to keep an antiaircraft gun or other device continually pointed at the target and even to range the gun and fire it automatically at the proper time.

This invention concerns radar systems in which the beam of spaced energy pulses can be maneuvered to first search the skies for a target and then to automatically track of follow the target after it is once found. More specifically, it is concerned with an improved automatic range tracking circuit for such a system. Components for performing a range tracking function have previously been proposed, but have suffered from a number of undesirable qualities. Among others they employed transfer relays operable in response to a predetermined signal amplitude to cause servo-motor control circuits to change from the general searching of the skies to actual tracking of the target. This method resulted in false control of the relays by thermal noise since the amplitude of the noise varies due to changes in the voltage of the power system supplying the radar set. Previous range tracking systems also employed rate slewing of the range gate to intercept the target in range and establish range tracking. If this type of scheme is employed as a manual function, initiation of tracking requires considerable skill on the part of the radar operator; and if the scheme is completely automatic, weak signal performance is not as reliable as is desired for satisfactory operation. By a unique range tracking circuit which employs, as part of a feedback loop, two units which are automatically changed from resistive feedback amplifiers to integrators during the target acquisition and lock-on phases of operation, I have provided an arrangement which overcomes such defects of the prior art.

One object of my invention is, accordingly, to provide a new and improved type of automatic tracking radar system.

Another object of the invention is to provide a novel and improved circuit for target acquisition and range tracking in radar apparatus.

A further object of the invention is to provide a novel method of target acquisition and lock-on in a radar system.

Another object is to provide a novel arrangement for controlling a radar range error detector during the acquisition phase of operation of a radar system whereby weak signal operation of the system is greatly enhanced.

A still further object of the invention is to provide a novel target detecting scheme in an automatic range tracking portion of a radar system.

The foregoing and other objects of my invention will become apparent through reading of the following description taken in connection with the accompanying drawings which form a part of this specification, and in which.

Figure 1:
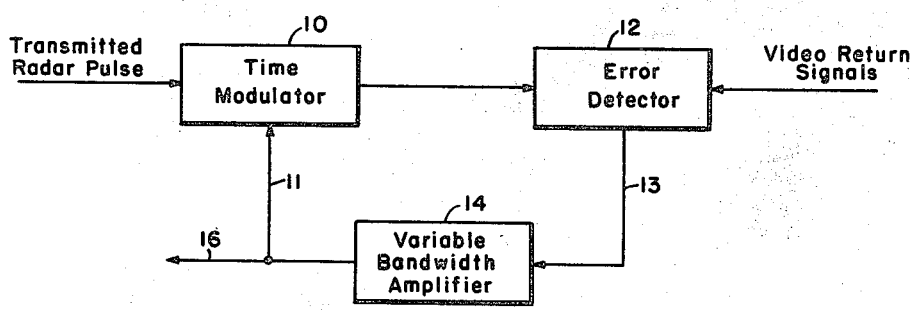
FIGURE 1 is a block diagram of a basic automatic range tracking loop.

Referring now to FIG. 1 of the drawings, the basic range tracking system shown consists of a time modulator 10, an error detector 12 and a feedback network which, in the present embodiment, consists of a variable bandwidth amplifier 14. Any range tracking system is designed to produce an output voltage proportional at any instant to the range (i.e., distance) of an object being tracked by the radar system. Various general types of such range tracking systems are described, for example, in "Electronic Time Measurements," Volume 20, M.I.T. Radiation Laboratories Series, edited by B. Chance, R. I. Hulsizer, E. F. MacNichol, Jr., and F. C. Williams, McGraw-Hill Book Co., Inc., New York, 1949. In the embodiment shown in FIG. 1, the time modulator 10 will vary the time position of an output voltage pulse with respect to a transmitted energy pulse from the radar transmitter as a function of a direct current error signal on line 11. The error detector, on the other hand, will produce a direct current output voltage on line 13 which is a function of the difference in time between the output voltage pulses from the time modulator and the target returns or reflected energy pulses received by the radar system. By applying at least a portion of the direct current output from the error detector to the time modulator via lines 13 and 11 and variable bandwidth amplifier 14, a servo system is established which will produce an output voltage at output lead 16 which is proportional to the range of the target being tracked.

When a target is being tracked, the direct current error signal from detector 12 will have rapid fluctuations appearing in its output due to range scintillation and thermal noise when the target returns fade. In addition, interfering signals which move at a speed relative to the radar set different from that of the target being tracked will produce rapid fluctuations in the output of the error detector. By adjusting the variable bandwidth amplifier 14 to have a very low frequency response (approximately one radian per second in the embodiment of the invention to be described), the aforementioned spurious signals are prevented from affecting control of the voltage appearing at output lead 16.

The above discussion has been confined to the case where a target is actively being tracked. Actually, before tracking takes place, there is a period of target acquisition and lock-on. During the time of target acquisition, the output of the error detector, for reasons hereinafter described, contains rapid changes of current above one radian per second which must be allowed to control the voltage on output lead 16. Consequently, some means must be provided to vary the bandwidth of amplifier 14 during the target acquisition and lock-on period. In addition, when a target is 10 to 30 miles distant, intermittent data is supplied to the range tracking unit by the radar because of fading of the radar signal. The intermittent data requires that the system be capable of producing a continuous output even in the absence of a received signal if the tracking process is not to be interrupted. Interruption of the process could possibly result in a condition where the target and radar beam no longer coincide so that position of the target can no longer be determined. The aforesaid requirements are fully met in the detailed embodiment of the present invention shown and described in FIGS. 2–5.

Figure 2:
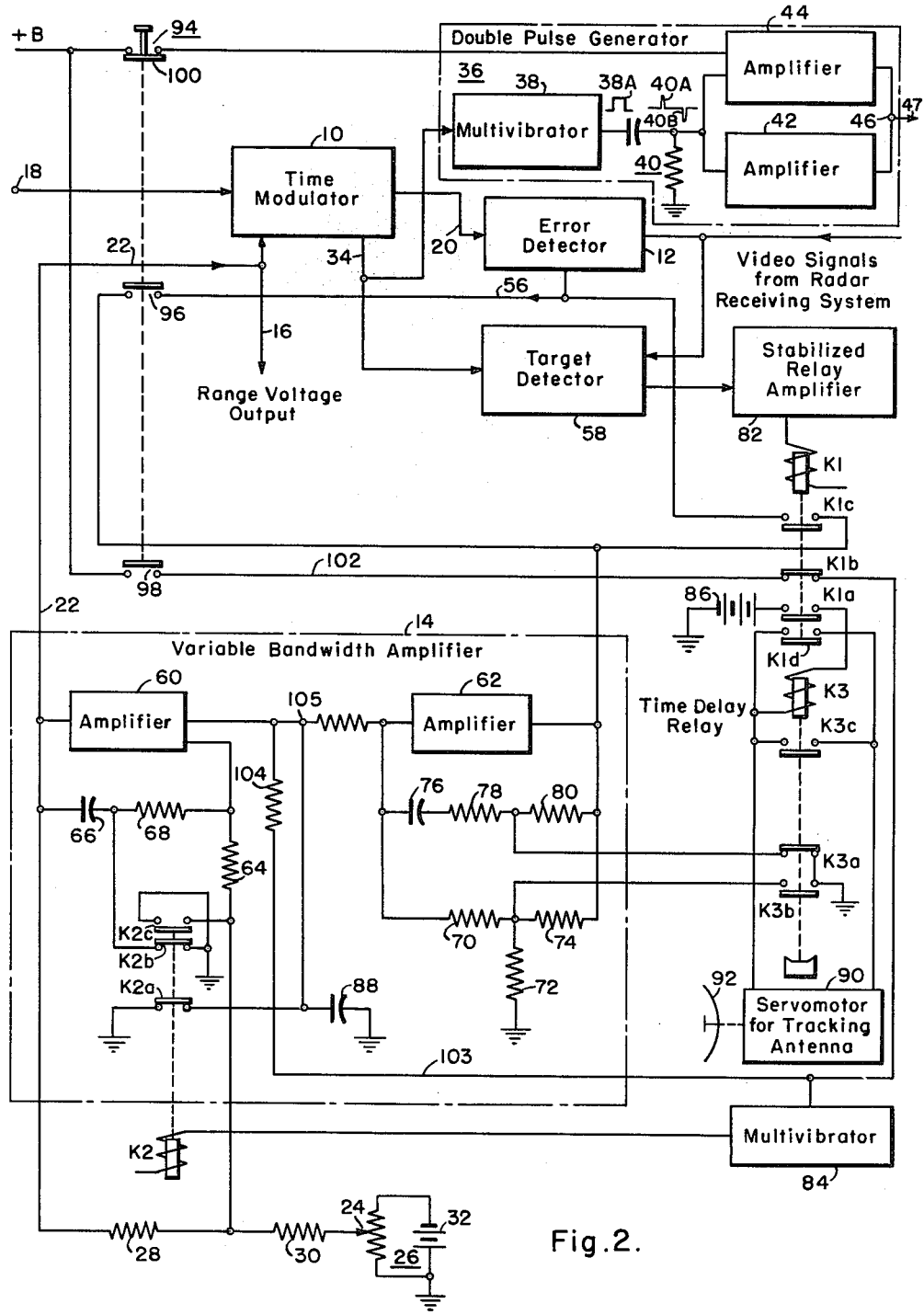
FIG. 2 is a block and schematic diagram of a portion of the circuits of an automatic range tracking system embodying the principles of my invention.
Figure 3:
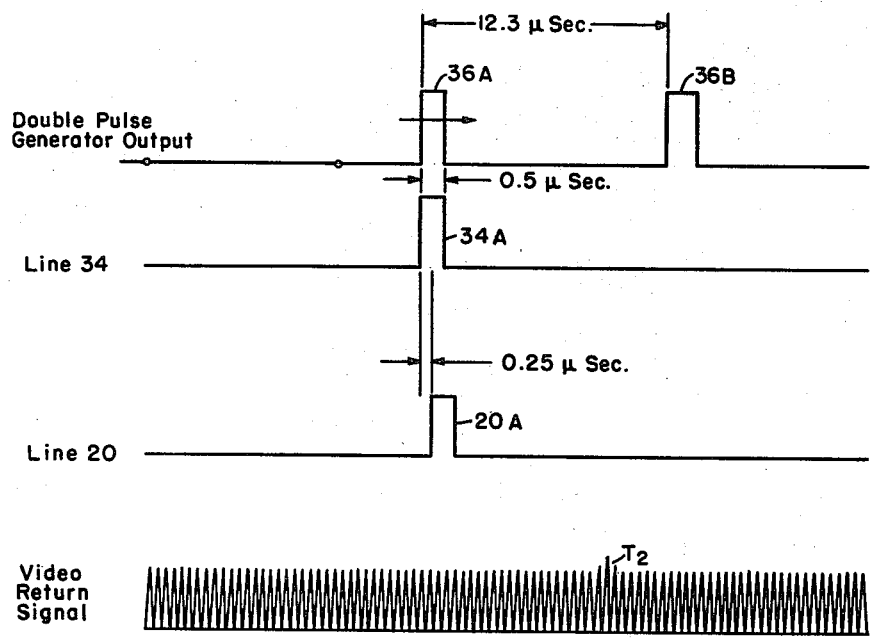
FIG. 3 is a graphical illustration of the output voltages of certain of the circuits shown in FIG. 2 which help to illustrate the operation of my invention.
Figure 5:
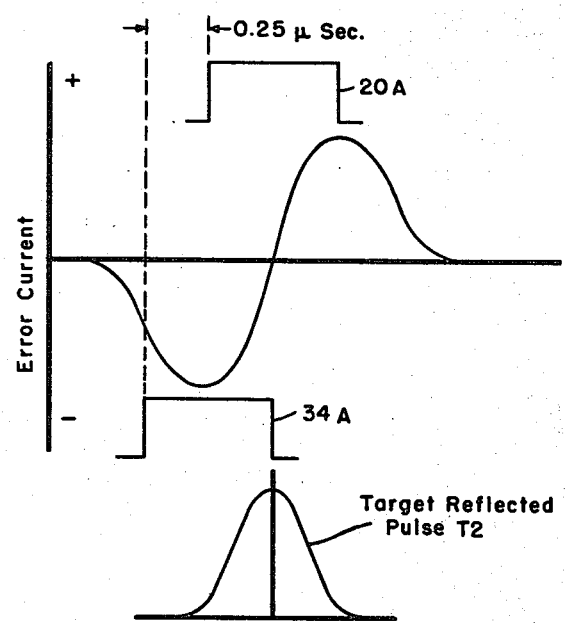
FIG. 5 is a graphical illustration of the output voltage characteristic of the range error detector and the target detector shown in FIG. 2, together with the time relationship of the input voltage pulses applied to these detectors.

Referring to FIG. 2, the detailed range tracking system of the invention shown includes the aforesaid time modulator 10, error detector 12 and variable bandwidth amplifier 14, enclosed by broken lines. A radar transmitter, not shown, sending out ultrashort wave pulses from a directable antenna in a manner too familiar to those skilled in the radio art to require detailed description here, impresses a synchronizing signal on terminal 18 when it sends out each pulse. This synchronizing signal is impressed on an input terminal of the time modulator 10 which produces a voltage pulse on its output line 20 following the signal on terminal 18 by an amount proportional to the potential impressed on line 22. The construction and operation of time modulators is well known by those skilled in the art and may be found, for example, in the aforesaid Vol. 20, M.I.T. Radiation Laboratory Series. The potential on line 22 may be adjusted at will by the radar operator adjusting the slider 24 on a voltage divider 26, and is determined in obvious degree by the relative magnitudes of resistors 28 and 30 and a source of voltage, such as battery 32. The time modulator 10 also produces an output voltage pulse on line 34. As shown in FIG. 3, the output pulse 34A on line 34 may, for example, precede by 0.25 microsecond the output pulse 20A on line 20. Both of these pulses may, like the transmitted radar pulse, be 0.50 microsecond long.

Line 34 also impresses its pulse 20A on a double pulse generator 36 which produces two output pulses 36A and 36B as shown in FIG. 3. Pulse 36A is coincident in time with pulse 34A while pulse 36B is about 12.3 microseconds later. These two pulses are, in turn, used to produce two spaced markings on a radar oscilloscope which may be adjusted in position at will by the radar operator in a manner hereinafter described.

In detail, the double pulse generator 36 comprises a multivibrator 38, the output of which is applied to a differentiating circuit 40. Multivibrator 38 is triggered by pulse 34A to produce a square wave pulse 38A which has a pulse width of 12.3 microseconds. After passing through the differentiating circuit 40, two voltage pulses 40A and 40B, separated by 12.3 microseconds, are produced. Pulse 40A is applied to amplifier 42, whereas pulse 40B is applied to amplifier 44, and the outputs of these two amplifiers are combined at junction 46 to produce the output wave form shown in FIG. 3. Amplifier 44 is connected to its B+ voltage supply through a normally closed switch, hereinafter described.

Figure 4:
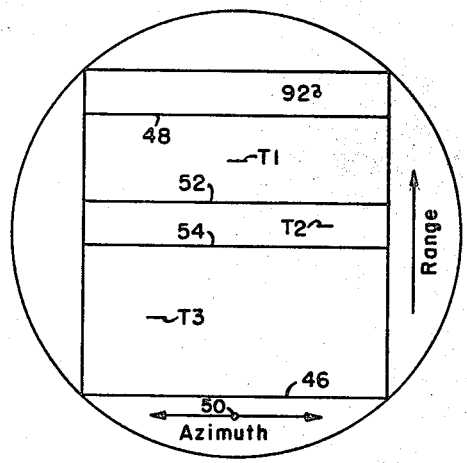
FIG. 4 is an illustration of a type of radar oscilloscope display which may be used with my invention.

One type of radar oscilloscope display which may be used effectively with the present invention is the well known B-scope, shown in FIG. 4. In this type of display, range and azimuth are presented in rectangular form. Range is plotted vertically from zero at line 46 to a maximum at line 48, while azimuth is plotted horizontally and extends to the right or left of a center point 50. Three targets T1, T2 and T3 are shown appearing on the radar scope. The two output pulses from double pulse generator 36 at output lead 47 (FIG. 2) are used in conjunction with a conventional sweep generator, not shown, to create two spaced horizontal lines 52 and 54 on the scope in a manner well known to those skilled in the art. These lines are always separated by a distance proportional to 12.3 microseconds and may be moved up or down by the radar operator to bracket any one of the targets.

In the initial phase of search for airborne objects, the radar operator orients the radar antenna to sweep the skies by means of a handle, not shown, and on the latter is a thumb wheel which adjusts the position of slider 24. By adjusting this thumb wheel, the time position of the output pulse 34A of time modulator 10 can be adjusted. This pulse, in turn, orients the two output pulses from generator 36 so that the two horizontal lines 52 and 54 on the radar scope bracket a particular target. The pulse 20A from modulator 10 and the return signal pulse from a target are impressed on the error detector 12 which is of any well known type of circuit (e.g., a phase discriminator) producing on its output line 56 a current proportional to the deviation from exact simultaneity of said two pulses. The line 56 thus carries a current proportional to the error or departure from exact coincidence of the time of occurrence of the pulse 20A and the target return pulse. The variation of the output current of error detector 12 with departure of the target-reflected pulse from exact coincidence in time with pulse 20A is shown by the graph in FIG. 5. When this coincidence is exact, the error current on line 56 is zero; when the pulse 20A occurs prior to the target reflected pulse the voltage of detector 12 is negative, and when the pulse 20A occurs after the target-reflected pulse, the voltage is positive. The target reflected pulse and the pulse 34A on line 34 are impressed on a target detector 58 which may have a circuit and an output voltage characteristic similar to that of error detector 12.

In detail, the variable bandwidth amplifier 14 consists of two series-connected amplifiers 60 and 62, amplifier 60 being of the non-phase inverting type. Each amplifier is equipped with two feedback paths. Amplifier 60 has one feedback path consisting of resistors 28 and 30, 64 and 68 and another consisting of resistor 64 and capacitor 66 and resistor 68 in series. In a similar maner, amplifier 62 is equipped with a first resistive feedback network consisting of resistors 70, 72 and 74; and a second feedback path of capacitor 76 and resistors 78 and 80. Relays, hereinafter described, are effective to ground one or the other of the feedback networks of each amplifier so that only one feedback network is connected to its associated amplifier at any one time. When the feedback path of resistors 28, 30, 68, and 64 is connected to amplifier 60 and when the feedback path of resistors 70, 72 and 74 is connected to amplifier 62, the units act as conventional resistive feedback amplifiers. When the feedback path of capacitor 66 and resistors 68, and 64 for amplifier 60 and that of capacitor 76 and resistors 78 and 80 for amplifier 62 are used, the units act as integrating amplifiers. That is, the voltage amplitude at their output is proportional at any instant to the ratio of voltage amplitude to frequency at their input. For a full and detailed description of amplifier feedback networks and their effect on operation, reference may be had to "Servomechanisms and Regulating System Design," Chestnut and Mayer, John Wiley and Sons, New York, 1951.

In order to control the operation of amplifiers 60 and 62, three relays K1, K2 and K3 are provided, K3 being a time delay relay. Relay K1 is controlled by a stabilized relay amplifier 82 which will energize relay K1 when a target is detected by detector 58. Relay K2 is controlled by a monostable multivibrator 84, and relay K3 is energized by a source of voltage, such as battery 86 when the normally open contacts K1a close upon energization of relay K1.

Besides contacts K1a, relay K1 has a pair of normally closed contacts K1b which are used to control multivibrator 84 and a pair of normally open contacts K1c which, when closed, serve to connect line 56 to the input of amplifier 62. Contacts K1d serve to initiate operation of a servomotor 90 which, in turn, controls the position of the directional antenna 92 of the radar system. Relay K2 has two pairs of normally closed contacts K2a and K2b and a pair of normally open contacts K2c. In the deenergized condition of the relay shown, contacts K2a ground one side of a capacitor 88, and contacts K2b ground the junction of capacitor 66 and resistor 68. Contacts K2c are adapted when closed to ground the junction of resistors 28 and 64. The contacts K3a of relay K3 normally ground one feedback path of amplifier 62; whereas contacts K3b are adapted, when closed, to ground the other feedback path. Contacts K3c are connected in parallel with contacts K1d for a purpose hereinafter explained.

Operation of the invention will now be described. In the target lock-on process, four modes of operation are employed. Operational characteristics of each of the modes, considered in succession, are as follows:

Phase I.—Manual strobing

When the radar operator detects a target on the radar oscilloscope shown in FIG. 4, he will adjust the position of slider 24 so that the voltage applied to time modulator 10 will orient the pulses generated by generator 36 to bracket a video return signal. The time relationship of the pulses is shown in FIG. 3. Note that the pulses 36A and 36B lie on each side of the target return which, in this case, we will designate by T2. On the radar scope (FIGURE 4), the lines 52 and 54, produced by pulses 36A and 36B, bracket target T2. The operator now positions a marking 92 at the top of the display by adjusting a control, not shown. This action will cause apparatus (not described herein) to position the antenna in azimuth to correspond to that of the target. The system is now ready to start the acquisition process.

Phase II.—Acquisition

When the radar operator has, as above stated, caused the lines produced by double pulse generator 36 to bracket a target pulse on the range oscilloscope, he closes a switch 94 (FIG. 2). This action closes contacts 96 and 98 and opens contacts 100. Consequently, the output of error detector 12 is now connected to the input of amplifier 62 to close the range tracking loop, and multivibrator 84 is connected to a source of B+ potential through line 102. In addition, the connection of amplifier 44 to B+ voltage supply is broken by the opening of contacts 100. Since amplifier 44, when operative, amplifies the pulse 36B shown in FIG. 2, line 52 on the radar oscilloscope which is produced by pulse 36B will disappear when the switch is closed.

When the source of B+ voltage is connected to multivibrator 84 by closure of contacts 98, the multivibrator periodically energizes relay K2 to reverse the condition of its contacts shown in FIG. 2. Thus, the ground on the connection of capacitor 66 and resistor 68 will be removed, and amplifier 60 will become an integrator. Likewise, the ground on one side of capacitor 88 will be removed. Capacitor 88 is now charged from B+ voltage supply via lines 102 and 103, and resistor 104. This results in a linear increase with time of the potential on input line 22 to time modulator 10, the current through resistor 104 being integrated by amplifier 60 and its associated feedback elements. The increasing input voltage on line 22 causes the time modulator to move the pulses 36A, 34A, and 20A to the right as shown in FIG. 3. The rectangular output wave form of monostable multivibrator 84 is such as to cause these pulses to move through a range of 12.3 microseconds, after which the rectangular wave of the multivibrator jumps to its other phase for one fiftieth of that time. During this second time, the relay K2 assumes its initial position shown in FIG. 2, thereby short circuiting capacitor 88 so that the potential at point 105 is returned to zero. The release of relay K2 also returns unit 60 to a resistive feedback amplifier configuration.

As soon as the voltage output of multivibrator 84 jumps again to its initial value, relay K2 reverses its contacts starting the charging of capacitor 88 to again increase the potential on line 22 linearly with respect to time. Therefore, pulses 36A, 34A and 20A repeat their cycle and begin their outward excursion to the right as shown in FIG. 3. This cycle repeats itself, the output of amplifier 60 being a sawtooth wave form, until the pulse 34A nearly coincides in time with the target-return pulse T2 in the target or phase detector 58. This action causes the latter, acting through stabilized relay amplifier 82, to actuate relay K1. Generally, relay K1 will be actuated during the first cycle of operation. However, the cycle may have to be repeated because of fading of the target return signal or for other reasons.

Even though the range tracking loop is closed immediately upon closure of switch 94, the output from error detector 12 on line 56 will be substantially zero until a very short time immediately preceding coincidence of pulse 20A with the target return T2. This is a result of the output error current characteristic of the target and error detectors shown in FIG. 5. Note that the target and error detectors do not produce an output error current until the time difference between the target return T2 and either pulse 20A or 34A is approximately equal to the pulse width of pulses 20A and 34A. At a 0.25 microsecond time difference, the error current is greatest, and at zero time difference the error current is substantially zero. In order to actuate relay K1 through stabilized relay 82, it is necessary that target detector 58 produce a substantial output current for amplifier 82. If pulse 34A were aligned with pulse 20A, the output of the target detector would be zero when the target return coincides with pulse 20A. Consequently, pulse 34A is made to lag pulse 20A by 0.25 microsecond so that target detector 58 will produce maximum output current when pulse 20A coincides with the target return T2.

It is apparent that since pulse 20A proceeds pulse 34A by 0.25 microsecond, there is a time delay between the time that target detector 58 actuates relay K1 to stop the charging process of capacitor 88 by opening contacts K1b in line 102 and the time that error detector 12 produces a substantial error current. The rate of change of voltage amplitude during this process is relatively great due to the relative motion of the pulsed target returns and the output pulses of modulator 10 as they approach coincidence and because capacitor 88 continues to charge during the aforementioned time delay. Consequently, the bandwidth of amplifier 14 must be sufficient to handle this rate of change in order that effective feedback control voltages be obtained at line 22. In one embodiment of the invention, which I have found to work satisfactorily, the bandwidth must be approximately 600 radians per second during this phase.

Phase III.—Wide bandwidth tracking

Once relay K1 is energized, contacts K1a will close, thereby connecting battery 86 to time delay relay K3. Because of the delay characteristics of relay K3 there will be a time delay of approximately two seconds between the closing of contacts K1a and energization of K3. Consequently, contacts K3a and K3b will not reverse their position shown in FIG. 2 to change amplifier 62 from a resistive feedback amplifier to an integrator, until two seconds have elapsed after coincidence of pulse 20A with the target return T2 in error detector 12. This transition period is necessary to filter the unsmooth error signal from error detector 12 so that capacitors 88 and 76 can "remember" the range rate voltage before switching to the following phase of operation. That is to say, capacitors 88 and 76 charge to a voltage proportional to the output voltage of error detector 12 so that if weak moving target returns are momentarily lost by the system, the pulse 20A will remain in its correct position in time and the system will not lose control. This phase of operation allows the integrating capacitors to charge to proper voltages so that severe transients are avoided when narrow bandwidth switching occurs in Phase IV. Energization of relay K1 also closes contacts K1d to cause the antenna servomotor to initiate the teaching process of antenna 92.

Phase IV.—Narrow bandwidth tracking

After the aforesaid two second time delay, contacts K3a open and contacts K3b close. Consequently, unit 62 is changed from a resistive feedback amplifier to an integrator. This results in a reduction in the bandwidth of amplifier 14 to approximately one radian per second. The reduction in bandwidth provides for excellent rejection of interference signals in the range tracking system while still providing adequate dynamic response. Any interference signals would cause the output at line 22 to vary at a rate much greater than one radian per second; but since the bandwidth of amplifier 14 will not now pass these signals, they are effectively prevented from controlling operation of the feedback loop.

Since the integrators retain their voltage output substantially constant over a period of time, loss of the target control signal momentarily due to weak signal reception will not cause the system to lose control as might be the case if an ordinary amplifier were used in the feedback network. It should be noted that if the target return signal fades momentarily relay K1 may become deenergized to open contacts K1d. Since, however, these contacts are shunted by the contacts K3c of relay K3, the operation of servomotor 90 will not be interrupted because relay K3 is of the time delay type and will not open its associated contacts upon momentary loss of signal.

It can thus be seen that I have provided an automatic range tracking system employing two units in a feedback network which can be used as resistive feedback amplifiers to effect acquisition and lock-on of a target and then can be used later as integrating amplifiers to discriminate against noise and other spurious signals.

Although I have described my invention in connection with a certain specific embodiment, it should be apparent to those skilled in the art that various changes in form and arrangement of parts can be made to suit requirements without departing from the spirit and scope of the invention.

I claim as my invention:

1. In a radar system adapted to receive reflected pulses of transmitted energy from a distant object, an automatic range tracking device including an error detector adapted to produce an output current which varies as a function of the range of said distant object, a time modulator responsive to a control current for producing spaced output pulses having a pulse repetition frequency equal to the transmitted pulse recurrence frequency of the radar system and a phase position relative to said transmitted pulses which is a function of said control current, a variable bandwidth amplifying device for applying the output of said error detector to said time modulator as a control current, and means for selectively varying the bandwidth of said amplifying device.

2. In a radar system adapted to receive reflected pulses of transmitted energy from a distant object, an automatic range tracking device including an error detector adapted to produce an output current which varies as a function of the range of said distant object, a time modulator responsive to a control current for producing spaced output pulses having a pulse repetition frequency equal to the transmitted pulse recurrence frequency of the radar system and a phase position relative to said transmitted pulses which is a function of said control current, a pair of serially-connected amplifiers for applying the output of said error detector to said modulator, each of said amplifiers being convertible from a resistive feedback amplifier to an integrating amplifier, and apparatus including a network of relays for automatically varying the bandwidth of said amplifiers when the reflected pulses of energy from said distant object substantially coincide in time with the output pulses of said time modulator.

3. In a radar automatic range tracking device including an error detector adapted to produce an output current which varies as a function of the range of a distant object being tracked by the radar system and a time modulator responsive to a control current for producing spaced output pulses having a pulse repetition frequency equal to the transmitted pulse recurrence frequency of the radar system and a phase position relative to said transmitted pulses which is a function of said control current; the combination of means for applying the output of said error detector to said time modulator as a control current, said means comprising a pair of serially-connected amplifiers, first and second feedback paths for each of said amplifiers, one of said paths for each amplifier including a resistor and a capacitor in series, the other of said paths for each amplifier including resistance elements only, and means for selectively grounding one or the other of the feedback paths for each amplifier.

4. In a radar automatic range tracking device including an error detector adapted to produce an output current which varies as a function of the range of a distant object being tracked by the radar system and a time modulator responsive to a control current for producing spaced output pulses having a pulse repetition frequency equal to the transmitted pulse recurrence frequency of the radar system and a phase position relative to said transmitted pulses which is a function of said control current; the combination of means for applying the output of said error detector to said time modulator as a control current, said means comprising first and second serially-connected amplifiers, a pair of feedback paths for each of said amplifiers, one of the paths for each amplifier including a resistor and a capacitor in series, the other path for each amplifier including resistance elements only, a first relay device adapted when deenergized to ground said one path of the first amplifier and adapted when energized to ground said other path of said first amplifier, a second relay device adapted when deenergized to ground said one path of the second amplifier and adapted when energized to ground said other path of said second amplifier, a phase detector for comparing the phase of radar video return signals with the phase of the output pulses of said time modulator, and means responsive to the output of said phase detector for causing energization of said first and second relays.

5. In a radar automatic range tracking device including an error detector adapted to produce an output current which varies as a function of the range of a distant object being tracked by the radar system and a time modulator responsive to a control current for producing spaced output pulses having a pulse repetition frequency equal to the transmitted pulse recurrence frequency of the radar system and a phase position relative to said transmitted pulses which is a function of said control current; the combination of means for applying the output of said error detector to said time modulator as a control current, said means comprising first and second serially-connected amplifiers, a pair of feedback paths for each of said amplifiers, one of the paths for each amplifier including a resistor and a capacitor in series, the other path for each amplifier including resistance elements only, a first relay device adapted when deenergized to ground said one path of the first amplifier and adapted when energized to ground said other path of said first amplifier, a second time delay relay device adapted when deenergized to ground said one path of the second amplifier and adapted when energized to ground said other path of said second amplifier, a phase detector for comparing the phase of radar video return signals with the phase of the output pulses of said time modulator, means for causing periodic energization of said first relay, and means responsive to the output of said phase detector to stop periodic energization of said first relay and cause permanent energization of said first relay and said second time delay relay.

6. In a radar automatic range tracking device, a time modulator responsive to a control current for producing two output signals, each of said signals comprising spaced output pulses having a pulse repetition frequency equal to the transmitted pulse recurrence frequency of the radar system and a phase position relative to said transmitted pulses which is a function of said control current, the pulses of the first of said output signals leading the pulses of the second of said signals, a first phase discriminator responsive to the first output signal of said time modulator and the video return signals received by the radar system for producing an output current which varies as a function of the phase difference between the pulses it compares, a second phase discriminator responsive to the second output signal of said time modulator and the video return signals received by the radar system for producing an output current which varies as a function of the phase difference between the pulses it compares, a variable bandwidth amplifier device for applying the output current of said first discriminator to said time modulator as a control current, and means responsive to the output current of said second discriminator for changing the bandwidth of said amplifier device.

7. In a radar automatic range tracking device, a time modulator responsive to a control current for producing two output signals, each of said signals comprising spaced output pulses having a pulse repetition frequency equal to the pulse recurrence frequency of the radar system and a phase position relative to said transmitted pulses which is a function of said control current, the pulses of the first of said output signals leading the pulses of the second of said signals, a first phase discriminator responsive to the first output signal of said time modulator and the video return signals received by radar system for producing an output current which varies as a function of the phase difference between the pulses it compares, a second phase discriminator responsive to the second output signal of said time modulator and the video return signals received by the radar system for producing an output current which varies as a function of the phase difference between the pulses it compares, first and second serially-connected variable bandwidth amplifiers for applying the output current of said first discriminator to said time modulator as a control current, each of said amplifiers being convertible from a resistive feedback amplifier to an integrating amplifier, apparatus for converting one of said amplifiers to an integrating amplifier and for applying a sawtooth waveform to said one amplifier, and means responsive to the output of said second discriminator for stopping said sawtooth waveform while maintaining said one amplifier as an integrating amplifier and for converting said second amplifier to an integrating amplifier.

8. In a radar system adapted to receive pulses of transmitted energy reflected from a distant object, an automatic range tracking device comprising, in combination, a time modulator responsive to a control current for producing spaced output pulses having a pulse repetition frequency equal to the transmitted pulse recurrence frequency of the radar system and a phase position relative to said transmitted pulses which is a function of said control current, an error detector adapted to produce an output current which varies as a function of the range of said distant object by comparing the phase of the output pulses of said time modulator with received pulses of energy reflected from said distant object, means for applying the output pulses of said time modulator to said error detector, a variable bandwidth amplifying device for applying the output of said error detector to said time modulator as a control current, and means for selectively varying the bandwidth of said amplifying device.

9. In a radar system adapted to receive pulses of transmitted energy reflected from a distant object, an automatic range tracking device comprising, in combination, a time modulator responsive to a control current for producing spaced output pulses having a pulse repetition frequency equal to the transmitted pulse recurrence frequency of the radar system and a phase position relative to said transmitted pulses which is a function of said control current, an error detector adapted to produce an output current which varies as a function of the range of said distant object by comparing the phase of the output pulses of said time modulator with received pulses of energy reflected from said distant object, means for applying the output pulses of said time modulator to said error detector, a variable bandwidth amplifying device for applying the output of said error detector to said time modulator as a control current, and means for varying the bandwidth of said amplifying device after reflected pulses of energy are first received by the radar system from a distant object.

10. In a radar system adapted to receive pulses of transmitted energy reflected from a distant object, an automatic range tracking device comprising, in combination, a time modulator responsive to a control current for producing spaced output pulses having a pulse repetition frequency equal to the transmitted pulse recurrence frequency of the radar system and a phase position relatve to said transmitted pulses which is a function of said control current, an error detector adapted to produce an output current which varies as a function of the range of said distant object, a variable bandwidth amplifying device for applying the output of said error detector to said time modulator as a control current, and means including switching apparatus for changing the bandwidth of said amplifying device when received energy pulses from a distant object substantially coincide in time with the output pulses from said time modulator.

11. In a radar system adapted to receive pulses of transmitted energy reflected from a distant object, an automatic range tracking device comprising, in combination, a time modulator responsive to a control current for producing spaced output pulses having a pulse repetition frequency equal to the transmitted pulse recurrence frequency of the radar system and a phase position relative to said transmitted pulses which is a function of said control current, an error detector adapted to produce an output current which varies as a function of the range of said distant object, a variable bandwidth amplifying device for applying the output of said error detector to said time modulator as a control current, means including switching apparatus for changing the bandwidth of said amplifying device when received energy pulses from a distant object substantially coincides in time with the output pulses from said time modulator, and time delay relay means actuable by said switching apparatus for further reducing the bandwidth of said amplifying device after the bandwidth of the amplifying device is first reduced by the means including said switching apparatus.

12. In a radar system adapted to receive reflected pulses of transmitted energy reflected from a distant object, an automatic range tracking device comprising, in combination, a time modulator responsive to a control current for producing spaced output pulses having a pulse repetition frequency equal to the transmitted pulse recurrence frequency of the radar system and a phase position relative to said transmitted pulses which is a function of said control current, an error detector adapted to produce an output current which varies as a function of the range of said distant object, a variable bandwidth amplifying device for applying the output of said error detector to said time modulator as a control current, means for selectively applying a substantially linearly varying voltage to said amplifier whereby the output pulses from said time modulator will shift in phase over a predetermined time interval, and means including switching apparatus for maintaining the aforesaid linear varying voltage constant at a predetermined level and for changing the bandwidth of said amplifying device when received energy pulses from a distant object substantially coincide in time with the output pulses from said time modulator.

13. In a radar system adapted to receive pulses of transmitted energy reflected from a distant object, an automatic range tracking device comprising, in combination, a time modulator responsive to a control current for producing spaced output pulses having a pulse repetition frequency equal to the transmitted pulse recurrence frequency of the radar system and a phase position relative to said transmitted pulses which is a function of said control current, an error detector adapted to produce an output current which varies as a function of the range of said distant object, a variable bandwith amplifying device for applying the output of said error detector to said time modulator as a control current, means other than said amplifying device for applying a control current to said time modulator to control the phase position of the output pulses from said time modulator, means for selectively applying a saw-tooth voltage waveform to said amplifier whereby the output pulses from said time modulator are periodically shifted in phase over a predetermined time interval, and switching apparatus for stopping said saw-tooth voltage waveform at a predetermined voltage level when received energy pulses from a distant object substantially coincide in time with the output pulses from said time modulator.

References Cited by the Examiner
UNITED STATES PATENTS

| 2,495,753 | 1/50 | Mozley | 343—7.3 X |
| 2,581,211 | 1/52 | Sink | 343—13 |
| 2,609,553 | 9/52 | Jacobsen | 343—13 |
| 2,624,877 | 1/53 | Chance | 343—11 X |

CHESTER L. JUSTUS, *Primary Examiner.*

NORMAN H. EVANS, *Examiner.*